United States Patent

[11] 3,602,885

[72] Inventor Ruben Grajeda
535 S. Joyce St., Rialto, Calif. 92376
[21] Appl. No. 853,383
[22] Filed Aug. 27, 1969
[45] Patented Aug. 31, 1971

[54] TRAILER FLAT TIRE WARNING DEVICE
2 Claims, 5 Drawing Figs.
[52] U.S. Cl. .................................................... 340/58, 200/61.44
[51] Int. Cl. ........................................................ B60c 23/00
[50] Field of Search ............................................ 340/58, 61; 200/61.42, 61.41, 61.44

[56] References Cited
UNITED STATES PATENTS
2,258,334 11/1941 Miller ........................... 340/58
2,640,119 5/1953 Bradford, Jr. ................. 340/58 UX
3,055,998 9/1962 Collins .......................... 340/58 X Primary Examiner—Alvin H. Waring ABSTRACT: A deflated tire warning device which is adaptable particularly for trailers being towed behind a vehicle, the device comprising a unit mounted on the fender rearward of the trailer rear wheels, each unit including a downwardly extending steel rod the lower end of which normally clears a road surface but which engages the same when the tire becomes deflated partly, thus causing the rod to pivot and move an arm within the unit into position to close an electrical circuit to a lamp upon the automobile dashboard where it may be observed by a driver thus warning him that a tire is becoming flat.

PATENTED AUG 31 1971
3,602,885
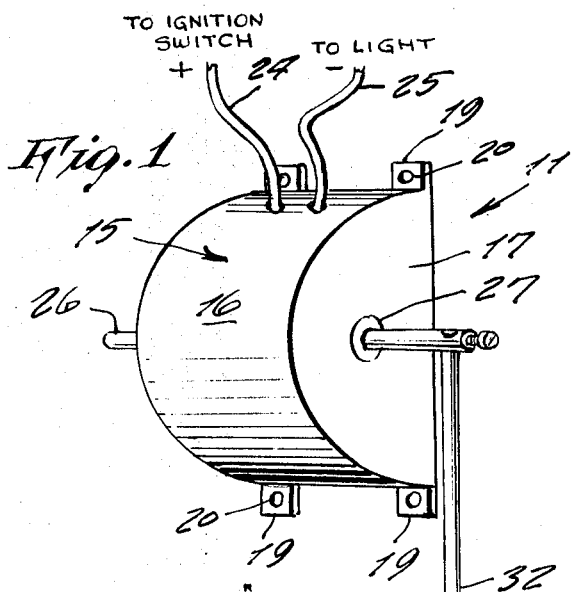
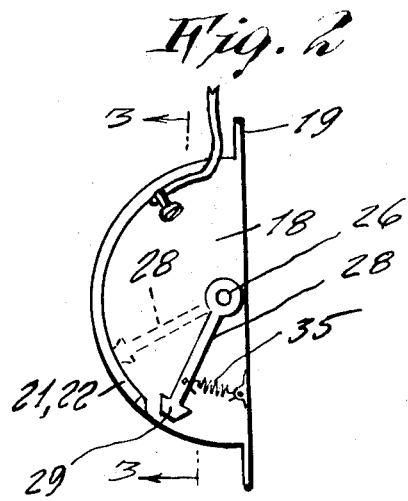
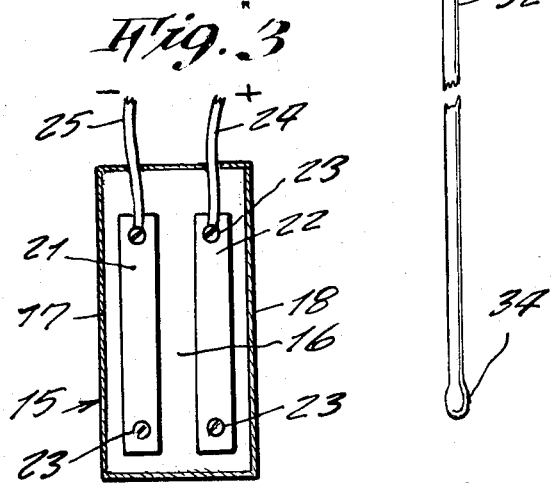
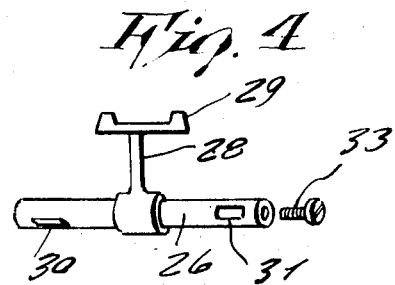
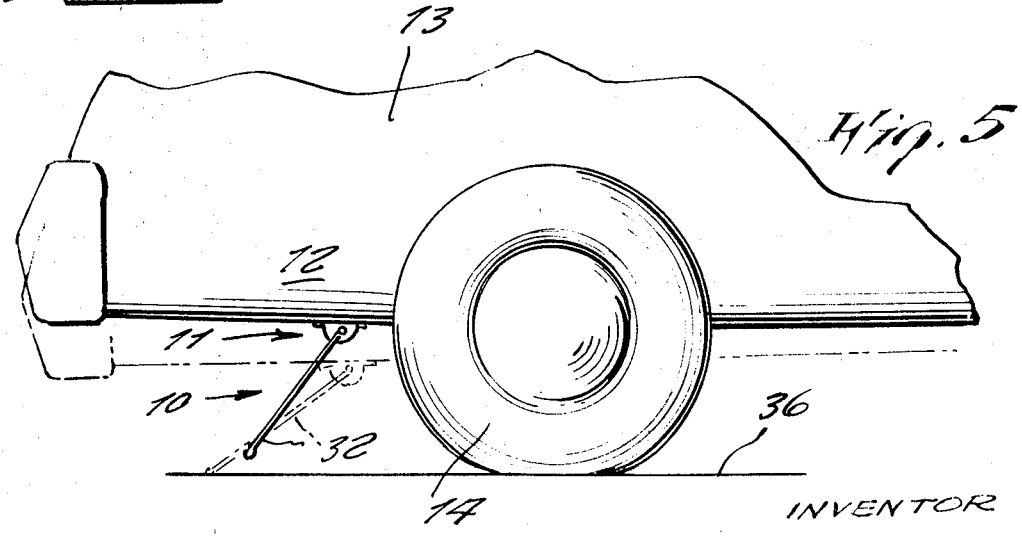
INVENTOR
RUBEN GRAJEDA

TRAILER FLAT TIRE WARNING DEVICE

This invention relates generally to tire deflation signalling devices.

A principal object of the present invention is to provide a tire deflation signalling device which is designed to be particularly adaptable for use upon trailers which are towed by another vehicle and which normally are found difficult for the driver to recognize when a flat tire is developing.

Another object of the present invention is to provide a trailer flat tire warning device which in case of a flat tire closes an electrical circuit with a lamp upon the automobile dashboard thus warning the motorist that a flat tire is developing.

Yet a further object of the invention is to provide a trailer flat tire warning device which will warn the motorist when the tire becomes only partly deflated without waiting until the tire is fully down thus providing sufficient time to stop and repair the same before the tire becomes too flat and causes the trailer to sway during travel.

Other objects of the present invention are to provide a trailer flat tire warning device which is simple in design, inexpensive to manufacture, rigged in construction, easy to use and efficient in operation.

These and other objects will be readily evident upon a study of the following specification and the accompanying drawing wherein:

FIG. 1 is a perspective view of one of the units secured behind each rear wheel of a trailer;

FIG. 2 is an end elevation view thereof shown with cover removed;

FIG. 3 is a cross-sectional view taken on the line 3—3 of FIG. 2;

FIG. 4 is a perspective view of a shaft and contact comprising a component of the present invention; and FIG. 5 is a fragmentary side elevation view of a trailer showing the present invention installed therein.

Referring now to the drawing in detail, the reference numeral 10 represents a trailer flat tire warning device according to the present invention wherein there is a pair of units 11, each one of the units being secured to a fender 12 of a trailer 13, each unit being positioned at the rear of each rear wheel 14.

Each unit 11 is comprised of a semicylindrical case 15 made preferably from plastic material. The case includes a semicylindrical sidewall 16 which is bounded at each opposite edge by an end wall 17 and 18. Tabs or brackets 19 are provided with openings 20 therethrough for receiving mounting bolts for attaching the case to the fender as shown in FIG. 5.

Upon the inner side of the case, a pair of copper strips 21 and 22 are mounted against concave side of the cylindrical sidewall 16 by means of screws 23. An electric wire conductor 24 and 25 is secured to each of the copper strips as shown in FIG. 3 of the drawing. The conductors extend outwardly of the case, one of the conductors 24 being positive and being connected to the ignition switch of the towing vehicle. The other of the conductors 25 being of negative polarity is connected to a lamp on the dashboard of the towing vehicle where the driver may readily see the same.

A shaft 26 extends through the case, the shaft 26 being journaled within bearings 27 in each opposite wall 17 and 18. A plastic arm 28 is rigidly secured to a central portion of the shaft 26, the plastic arm supporting at its terminal end a copper contact 29, shown in FIG. 4 of the drawing which serves to bridge the copper strips 21 and 22 when the shaft 26 is rotated so as to sweep the plastic arm 28 upwardly. As shown in FIG. 4, openings 30 and 31 are provided at opposite ends of the shaft, the openings being offset relative to each other so as to accommodate a vertical or horizontal installation of the unit upon the trailer. One of the openings 30 or 31 is selected for receiving one end of a steel rod 32 which is then rigidly secured to the shaft by means of a set screw 33 received in the end of the shaft 26 for abutment against the side of the steel rod 32. The rod comprises a straight elongated member having an enlarged head 34 at its opposite end.

As shown in FIG. 2 of the drawing, it is to be noted that the copper strips 21 and 22 do not extend fully to the lower portion of the cylindrical sidewall 16 thereby preventing the contact 29 from engaging the copper strips when the plastic arm 28 is in a lowered position as shown by the solid lines in FIG. 2. A tension coil spring 35 normally urges the plastic arm to rest in a downward position.

When the device is installed upon the trailer, as shown in FIG. 5 of the drawing, the rod 32 will depend downwardly and slightly rearward with the lower end of the rod clearing the roadway 36 by approximately 1 and ½ inches. However, in operative use, in case of a flat tire, the body of the trailer will become lowered due to the lack of air in the tire thus lowering the unit 11 respective to the roadway and causing the lower end of the rod 32 to brush against the roadway, thus causing the rod 32 to pivot the shaft 26 and thus cause the copper contact 29 to be moved rotatably until it engages the copper strips, as indicated by the dotted lines in FIG. 2 of the drawing. In such position, an electrical circuit is closed which lights up the lamp upon the dashboard thus warning the driver.

What I now claim is:

1. In a trailer flat tire warning device, the combination of a pair of units, each one of said units being mounted to a fender of a trailer being towed by a towing vehicle, each of said units being positioned at the rear of the rear wheels of said trailer, and each of said units having self-contained means for warning a driver in the towing vehicle in case the trailer tires start to become flat;

each of the aforesaid units comprising a plastic case, said plastic case being of semicylindrical configuration and including a semicylindrical sidewall bounded at its opposite ends by parallel end walls, mounting lugs integral with said case for securement of said case to said fender, said case having a pair of parallel copper strips secured to the inner concave side of said semicylindrical sidewall, each of said copper strips being connected by a wire conductor extending outwardly of said case, one of said conductors being connected to an ignition switch of said towing vehicle, the other of said conductors being connected to a lamp on the dashboard of said towing vehicle, a transverse extending shaft extending through said case and being journaled within bearings in said end walls, a plastic arm secured to a central portion of said shaft, the terminal end of said plastic arm carrying a copper contact for bridging across said copper strips when said shaft is pivoted, said copper strips not extending to a lower portion of said case sidewall whereby said copper contact does not bridge the same, and said plastic arm being normally urged by a tension spring downward to prevent said contact engagement.

2. The combination as set forth in claim 1 wherein one end of a steel rod is secured to an outward extending end of said shaft, said rod comprising a straight elongated member with an enlarged head at its opposite end for engaging a roadway surface in case of a flat tire.